C. F. JENKINS.
MOTION PICTURE PROJECTING APPARATUS.
APPLICATION FILED AUG. 3, 1918.
1,311,073. Patented July 22, 1919.
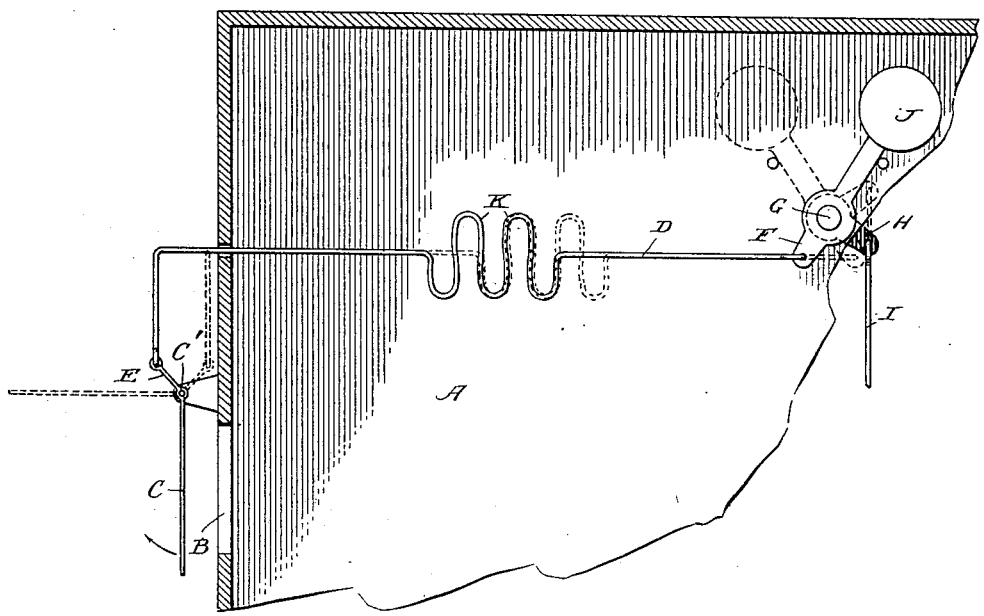

UNITED STATES PATENT OFFICE.

CHARLES FRANCIS JENKINS, OF WASHINGTON, DISTRICT OF COLUMBIA, ASSIGNOR TO THE GRAPHOSCOPE COMPANY, OF WASHINGTON, DISTRICT OF COLUMBIA, A CORPORATION OF DELAWARE.

MOTION-PICTURE-PROJECTING APPARATUS.

1,311,073.     Specification of Letters Patent.     Patented July 22, 1919.

Application filed August 3, 1918. Serial No. 248,163.

*To all whom it may concern:*

Be it known that I, CHARLES FRANCIS JENKINS, a citizen of the United States, and resident of Washington, in the District of Columbia, have invented certain new and useful Improvements in Motion-Picture-Projecting Apparatus, of which the following is a specification, reference being had therein to the accompanying drawing.

The general object of this invention is to provide for properly framing film pictures before they are allowed to fall upon the screen, whereby spectators see no annoying adjustments when an expired reel is immediately followed by a second reel relating to the same subject. The immediate object is to provide for convenient manual opening of the fire shutter at any time, to allow adjusting or framing the pictures before they are projected upon the screen.

In practice, if but one machine be used, a film too long to be carried by one reel must be divided and wound upon two reels and when the film upon the first reel is exhausted, this reel must be replaced by the other while spectators wait. Because this is undesirable, it is usual to employ two machines arranged to project at as nearly as may be upon the same screen area.

By this means the second section of the film follows the first without material interval, but the first pictures of the second reel do not appear, usually, at the proper point or properly "framed" and adjustments must be made by the operator. The error to be corrected and the adjusting movements of the pictures are as visible to the public as to the operator and are not pleasing. I obviate the difficulty by providing for at will opening the fire shutter while the light is prevented from passing to the screen and by inspecting and adjusting the illuminated picture at the exposure opening while the machine is at rest.

In the accompanying drawing, a part of a projecting machine provided with my devices is shown in vertical section parallel to the direction of the projecting light beam.

In this drawing, A represents a part of the ordinary casing for film feeding devices, and B the usual exposure opening. C designates a common fire shutter pivoted at C' in front of the opening and operated by a reciprocating rod D having its ends pivotally connected, respectively, to an arm E of the fire shutter and to an arm F upon a rock shaft G actuated, when the speed of the machine reaches or falls materially below normal speed, by a second rock shaft arm H which is raised and lowered by a rod I operated by well known devices not shown, and thus the fire shutter is opened and closed by the thrust and pull of the rod D. The rock shaft G yieldingly resists movement from either limit of its path of travel and is held steadily in position, ordinarily, by a weight J arranged to swing from side to side of the vertical plane of the rock shaft. I provide for opening the fire shutter manually without disturbing other mechanism by interposing a spring through which the opening and closing power is transmitted. For illustration. this spring is shown as formed by bending the rod D back and forth in a plane, as indicated at K.

This construction while not indispensable is advantageous since the film is never caught in a flat spring of this kind and in such location. The shutter is very light and this spring is not flexed in moving it back and forth, but when the hand raises the shutter the spring readily yields, virtually shortening the rod, which however is always ready to operate as before the instant the hand releases the shutter.

When two machines are used and the second is provided with my devices, the time required for exhibiting the film on the first reel is quite sufficient for making the second machine and reel ready. This is done by putting a second reel in place, threading the film, arranging the rotary shutter to prevent the passing of light to the screen, allowing some light to pass to the fire shutter, opening the door of the casing to expose a picture at the exposure opening, manually raising the shutter, inspecting the exposed picture, and making needed framing adjustment thereof. This done, when the first reel is exhausted it is cut out and the second reel is "cut in", without interval, and the exhibition continues without the usual annoying adjustments after the new reel pictures begin to appear upon the screen.

It may be noted that the mechanism, parts, joints, wear, needed skill, and cost remain unchanged.

What I claim is:

1. In a picture projecting machine, the combination with a fire shutter, of a spring arranged to transmit opening and closing power to said shutter and adapted to transmit such power without flexure and to yield when greater opening power is manually applied to the shutter, whereby a fire shutter operable as usual may be manually opened when the machine is at rest.

2. In motion picture machines, the combination with a casing having an exposure opening of a normally closed fire shutter arranged to be automatically opened and closed by the machine as the movement of the latter rises to and falls below proper exhibiting speed, and means whereby the closed shutter may be manually opened at will.

3. The combination with a pivoted fire shutter, of automatic means for opening and closing the shutter as the speed of the machine rises and falls, said means including a spring unaffected by the power normally transmitted but adapted to yield when stronger force tends to open the shutter normally held closed by the machine at rest.

4. In a motion picture machine, the combination with a casing having the usual film exposing opening of a fire shutter in front of the opening and normally held closed by the operating mechanism, means connecting the shutter to speed-governed devices whereby the shutter is automatically opened and closed as the speed of the machine rises to or falls below proper projecting speed, said means including devices adapted to transmit the ordinary shutter operating power without yielding and to yield resiliently when stronger opening force is applied to the shutter.

5. The combination with the casing having an exposure opening and a shutter pivoted in front of the opening, a reciprocating rod connected to the shutter, and means for reciprocating the rod, said rod being provided with a spring permitting its longitudinally shortening when suitable opening force is applied to the shutter.

6. The combination with the casing having the usual exposure opening, of a normally closed shutter pivoted in front of the opening, a speed-controlled member for operating the shutter, and a rod connecting said member to the shutter and having a portion of its body formed into a spring adapted to be compressed by force acting longitudinally upon the rod.

In testimony whereof I hereunto affix my signature.

CHARLES FRANCIS JENKINS.

Copies of this patent may be obtained for five cents each, by addressing the "Commissioner of Patents, Washington, D. C."